United States Patent [19]

Bussiere

[11] Patent Number: 5,054,561
[45] Date of Patent: Oct. 8, 1991

[54] BRACKET FOR ATTACHMENT OF A GROUND WORKING TOOL ON A TOOL BAR

[75] Inventor: Raymond Bussiere, Vonda, Canada

[73] Assignee: High-Line Manufacturing Inc., Vonda, Canada

[21] Appl. No.: 644,290

[22] Filed: Jan. 22, 1991

[51] Int. Cl.⁵ ............................................. A01B 73/00
[52] U.S. Cl. ................................... 172/674; 172/662; 172/763
[58] Field of Search ............... 172/763, 662, 739, 466, 172/482, 674, 675, 776; 37/230, 231, 235, 271; 248/296; 403/374, 84, 85; 292/202, 338

[56] References Cited

U.S. PATENT DOCUMENTS

| | | | |
|---|---|---|---|
| 1,541,046 | 6/1925 | Hall | 292/202 |
| 2,574,961 | 11/1951 | Couture | 292/210 |
| 2,675,752 | 4/1954 | Waugsgard | 172/492 |
| 2,873,149 | 2/1959 | Redetzke | 172/763 |
| 2,950,956 | 9/1958 | Rogers et al. | 172/763 |
| 3,139,145 | 6/1964 | Hofer | 172/763 |
| 3,834,466 | 9/1974 | Chandler | 172/776 |
| 3,917,331 | 11/1975 | Duran | 292/338 |
| 4,029,155 | 6/1977 | Blair et al. | 172/763 |
| 4,817,729 | 4/1989 | McCormick | 172/776 |
| 4,991,661 | 2/1991 | Barenthsen | 172/763 |

Primary Examiner—Dennis L. Taylor
Assistant Examiner—Spencer K. Warnick, IV
Attorney, Agent, or Firm—Adrian D. Battison; Stanley G. Ade; Murray E. Thrift

[57] ABSTRACT

A ground working implement includes a tool bar and a tool element which can be pulled across the ground by its attachment to the tool bar by a bracket and link system. The link comprises a U-shaped arm with a transverse portion parallel to an axis of rotation of the tool. The transverse portion is carried in a bracket depending from an underside of the tool bar. The transverse portion is formed of a tubular member which has a projecting portion extending radially from the axis of the tubular portion. The projecting portion has two side plates which rub against side plates of the channel to prevent side to side movement of the tool. The tool can raise or lower by rotation of the transverse portion of the channel or by lifting of the transverse portion in the channel within the limits defined by a base plate of the channel or a transverse restraining pin. The tool is latched in a raised position by a latch plate attached to the projecting portion which wedges underneath the base plate of the channel.

14 Claims, 4 Drawing Sheets

BRACKET FOR ATTACHMENT OF A GROUND WORKING TOOL ON A TOOL BAR

BACKGROUND OF THE INVENTION

This invention relates to a ground working implement of the type including a tool bar which is mounted for movement across ground to be worked, a ground working tool for engagement with the ground and an attachment bracket for mounting the tool on the tool bar so that a forward pulling force is applied to the tool by the tool bar.

The invention is particularly but not exclusively concerned with an attachment bracket for ground working tools such as packers or active harrow elements which are mounted for rotation about an axis transverse to the forward movement of the bar and have a width substantially greater than the distance of the axis from the tool bar.

In the seventies and early eighties, ground working tools of this type such as packers have been trailed well behind a tool bar on a long tongue. In more recent years however, this previous design has been found to be relatively cumbersome both from the point of view of changing to a transportation mode and from the point of view of the relatively large overlap which is necessary between adjacent tools to ensure proper action on all parts of the ground without spaces between the tools. A modified arrangement for packers and similar devices has therefore been recently adopted by many manufacturers in which the rotation shaft of the packer is supported on a pair of arms each directly connected to the tool bar by a suitable bracket with the arm having a substantially minimum length to allow the packer to trail behind the tool bar and extend from the tool bar downwardly to the ground. This device has achieved substantial success but there remain difficulties in providing the twisting action which is necessary should one end of the tool be lifted by the ground relative to the other end.

In addition problems arise where it is required to mount a tool of this type, for example a harrow element or a packer element rearwardly of an existing tool bar, for example of a cultivator which already carries a number of cultivator shanks. This problem arises in that the conventional method for attachment of the brackets for the arms of the tools is by U-shaped clamps which engage around the tool bar and support the bracket and the arm on a rear face of the tool bar. The necessity for a pair of such clamps for each tool element often causes problems of obtaining enough space on the tool bar to accomodate all of the necessary clamping elements and other equipment carried by or mounted on the tool bar. This interferes with the proper and orderly location of the tool elements on the tool bar.

SUMMARY OF THE INVENTION

It is one object of the present invention, therefore, to provide an improved ground working implement and particularly an improved system of attachment bracket for attachment of the tool to the tool bar.

According to the invention, therefore, there is provided a ground working implement comprising a tool bar for transportation in a horizontal orientation across ground to be worked, a ground working tool for engagement with the ground and an attachment bracket for mounting the tool on the tool bar for applying a pulling force to the tool to draw the tool across the ground in the working operation thereon, the tool including an attachment link member extending from the tool forwardly into engagement with the bracket and including an elongate transverse portion generally transverse to the pulling force for engaging the bracket, the bracket defining a channel member for receiving the transverse portion therein having a front restraining wall means and rear restraining wall means spaced sufficiently to receive the transverse portion therebetween, means mounting the channel member on the tool bar with said front and rear wall means generally upright, spaced first and second limit means defining upper and lower limits allowing limited up and down movement of the transverse portion within the channel member, the transverse portion being shaped in a cross section at right angles to a longitudinal axis thereof to allow rotation of the transverse portion about the longitudinal axis within said channel member and cooperating engagement means for preventing movement of the transverse portion relative to the channel member in a direction longitudinal of the axis including a first engagement means on the transverse portion and a second engagement means on the channel member.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
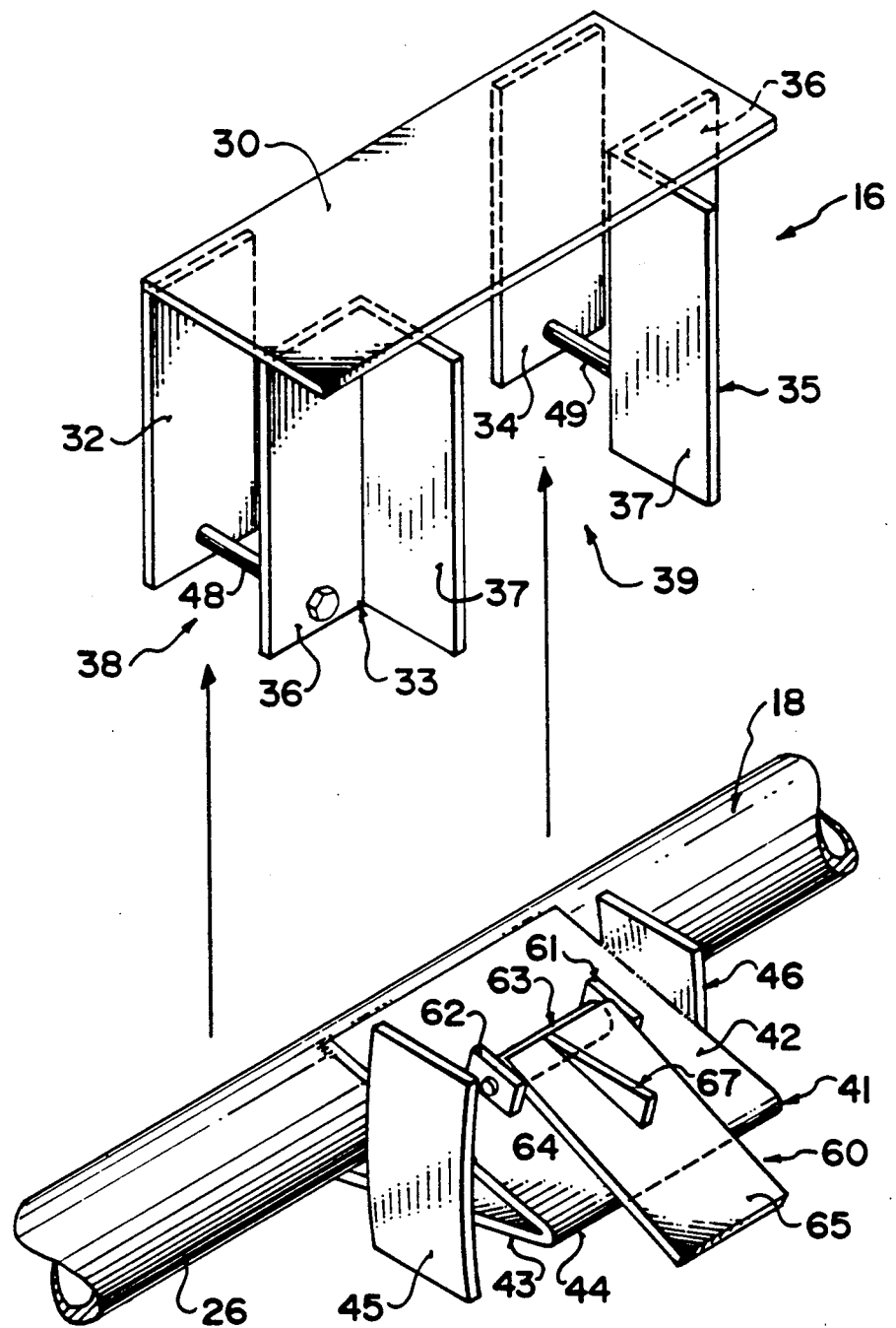
FIG. 1 is an isometric view partly exploded of an attachment bracket and link for coupling between the tool bar and a tool element of a ground working implement according to the present invention.

The ground working implement includes a tool bar 10 in the form of a conventional tubular beam mounted on ground wheels one of which is schematically indicated at 12 so that the bar 10 is supported in substantially horizontal orientation for movement in a working direction which is transverse to the length of the bar. The ground wheel 12 includes a system 14 for raising and lowering the bar 10 relative to the ground. The arrangements of the ground wheel and lifting system are shown only schematically as these vary significantly in design and are well known to one skilled in the art. Upon the tool bar 10 is mounted a bracket generally indicated at 16 for receiving a transportation link 18 of a tool element 20.

In the embodiment shown, the example of the tool element 20 is a packer element in the form of a helical coil which is mounted upon a shaft 22 for rotation in bearings 24 carried at the ends of a U-shaped link 18.

The U-shaped link includes a pair of arms 23 and 25 and a transverse portion 26 connecting the arms which extend substantially parallel to the shaft 22 and has a length significantly less than the length of the shaft 22 and slightly greater than the width of the bracket 16 as explained in more detail hereinafter. The arms 23 and 25 thus diverge outwardly from the ends of the transverse portion 26 and include rearwardly turned ends 27 and 28 which thus lie substantially at right angles to the axis of the shaft 22 and each carries a respective one of the bearings 24.

The construction of the helical packer element is not shown in detail as this is well known to one skilled in the art. In addition alternative tool elements may be used for example packer gangs of the type comprising a plurality of packer discs mounted upon a shaft for common rotation about the axis of the shaft. In another example, the tool elements can be provided by an active harrow element for example of the type shown in U.S. application Ser. No. 527,207 filed May 23, 1990 which comprises a cylindrical drum from the peripheral surface which extends a plurality of rods shaped to engage the ground in a harrowing action as the drum rotates in response to its forward movement across the ground.

Figure 2:
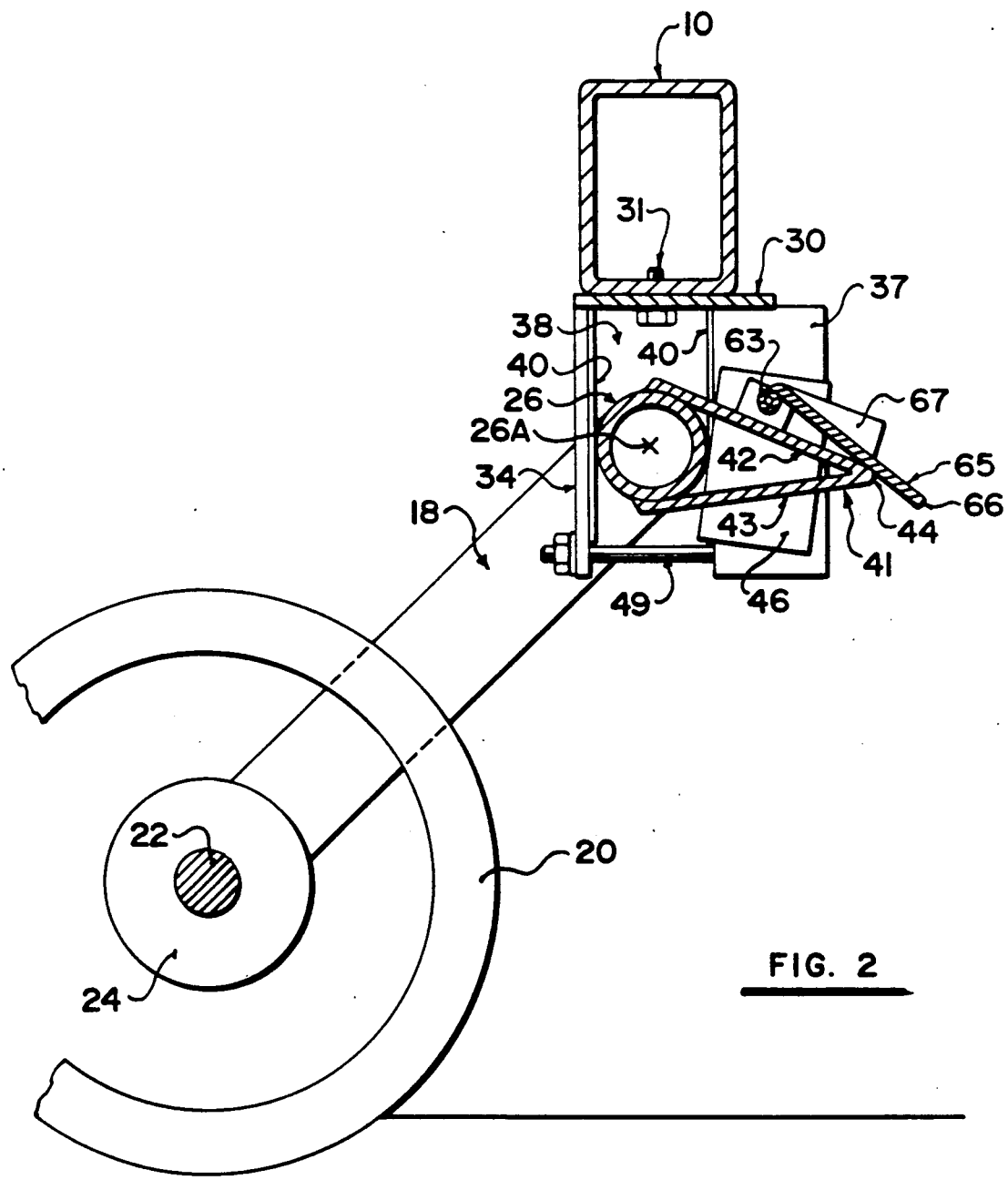
FIG. 2 is a vertical cross sectional view through the attachment bracket and link of FIG. 1 and including the tool bar and tool element.

Turning now particularly to FIGS. 1 and 2, the bracket 16 includes a base plate 30 in the form of a flat rectangular plate which is attached on the underside of the beam 10 by screws 31 or in an alternative arrangement by welding so that the plate lies in a horizontal plane attached to the flat lower surface of the bar 10.

The flat plate 30 is attached to downwardly extending flanges 32, 33, 34 and 35 which are welded to the underside of the plate 30 so as to form substantially a channel member. The flanges 32 and 34 are arranged in the same plane at the rear of the plate 30 and extending vertically downwardly therefrom. A single plate can be provided to form the two portions 32 and 34 or more preferably portions are formed separately with a space therebetween. The flanges 33 and 35 are each formed from an angle member defining a first flange portion 36 and a second flange portion 37 arranged at right angles. The flange portions 36 are arranged to be directly parallel to the plane of the flanges 32 and 34 and also to lie in the same common plane thus defining therebetween the channel generally indicated at 38. The channel thus includes a base defined by the base plate 30 and two side walls with an open lower face.

The flanges 37 project forwardly from the plane of the flanges 36 so that the flanges 37 are parallel but spaced by an opening generally indicated at 39.

Each of the inwardly facing surfaces of the flanges 32, 34 and 36 include a layer 40 of a wear resistant material such as polyethyelene. In addition the inwardly facing surfaces of the flanges 37 similarly carry the wear resistant material. This material can be attached by adhesive, riveting or other techniques which provide an inwardly facing smooth surface against which working action of the link 18 will occur.

The transverse portion 26 of the link 18 comprises a cylindrical tubular member the outside surface of which is circular in cross section so as to allow rotation of the transverse portion 26 about an axis longitudinal of the transverse portion and parallel to the axis of the shaft 22. The transverse portion carries a projecting member generally indicated at 41 defined by a pair of plates 42 and 43 welded to upper and lower surfaces of the transverse portion 26 respectively and converging to an apex 44 projecting forwardly from the transverse portion.

The plates 42 and 43 are arranged symmetrically so that the apex 44 lies on a plane bisecting the angle between the plates and passing through the axis 45.

Figure 4:
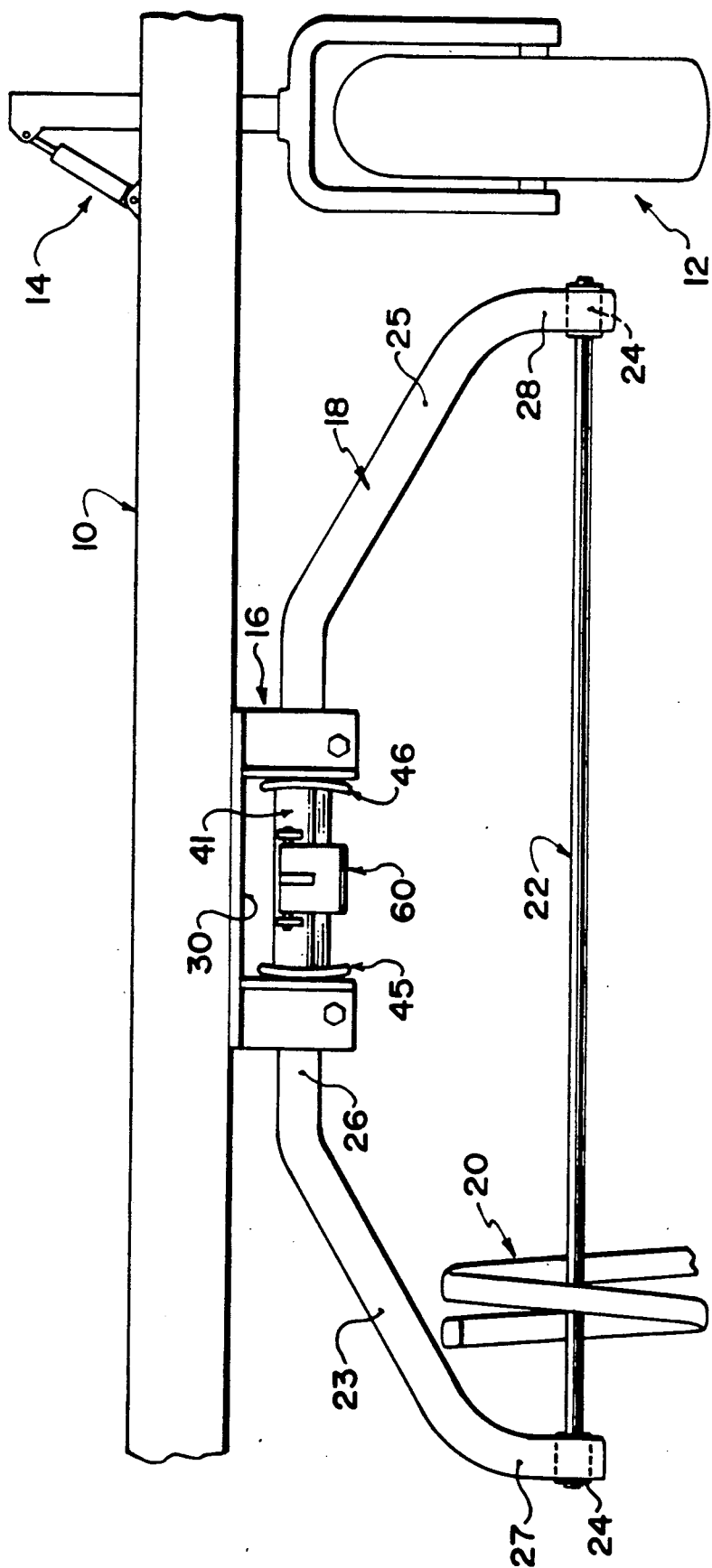
FIG. 4 is a front elevational view of the tool element, link, bracket and tool bar of FIGS. 2 and 3.

Across the open face at each end of the projecting member 41 is attached a slide plate 45, 46 which thus lies in a substantially vertical plane just forward of the front surface of the transverse portion 26. As best shown in FIG. 4, the plates 45 and 46 have a slightly convex outer surface for engagement with the wear coating on the flange portions 37. The width of the projecting member 41 is a little less than that of the transverse portion 26 and equal to the space 39. This ensures that the portion of the transverse portion in cooperation with the channel is straight and the bends forming the arm 23 and 25 are well away from that portion.

In normal operation of the tool on the tool bar, a pair of bolts 48 and 49 is removed from their normal position joining the bottom edge of the flange portion 36 to the flange 32 and 34 respectively. With the bolts removed, the transverse portion 26 can simply be lifted into place within the channel of the bracket and then the bolts can be replaced to ensure that the transverse portion cannot simply drop out of the bottom of the channel and is held in position within the channel to receive forces from the flanges defining the channel. The bolts 48 and 49 thus act to locate the transverse portion and also transmit forces from the rear flanges 32 and 34 to the front flanges 33 and 35 which are reinforced by the attachment of the upper edge of the angle iron forming these flanges to the base plate.

As shown in FIG. 2, in the normal working position of the tool on the ground, the projecting portion 41 extends substantially directly forwardly from the transverse portion 26 so that the plates 45 and 46 lie substantially wholly in contact with the inside surfaces of the flanges 37. Forward force on the transverse portion 26 is thus provided by the flanges 32 and 34 tending to draw the tool across the ground. The arms 18 are relatively short so that the tool is kept closely behind the tool bar 10 to prevent significant side to side movement. The tool can however twist as ground level changes or if it engages an obstruction so that one end can lift relative to the other end by the transverse portion tilting within the channel. Also as the ground level as a whole raises and lowers, the transverse portion can either be lifted in the channel or can rotate in the channel depending upon the combination of forces applied to the arms and the transverse portion by the tool.

Figure 3:
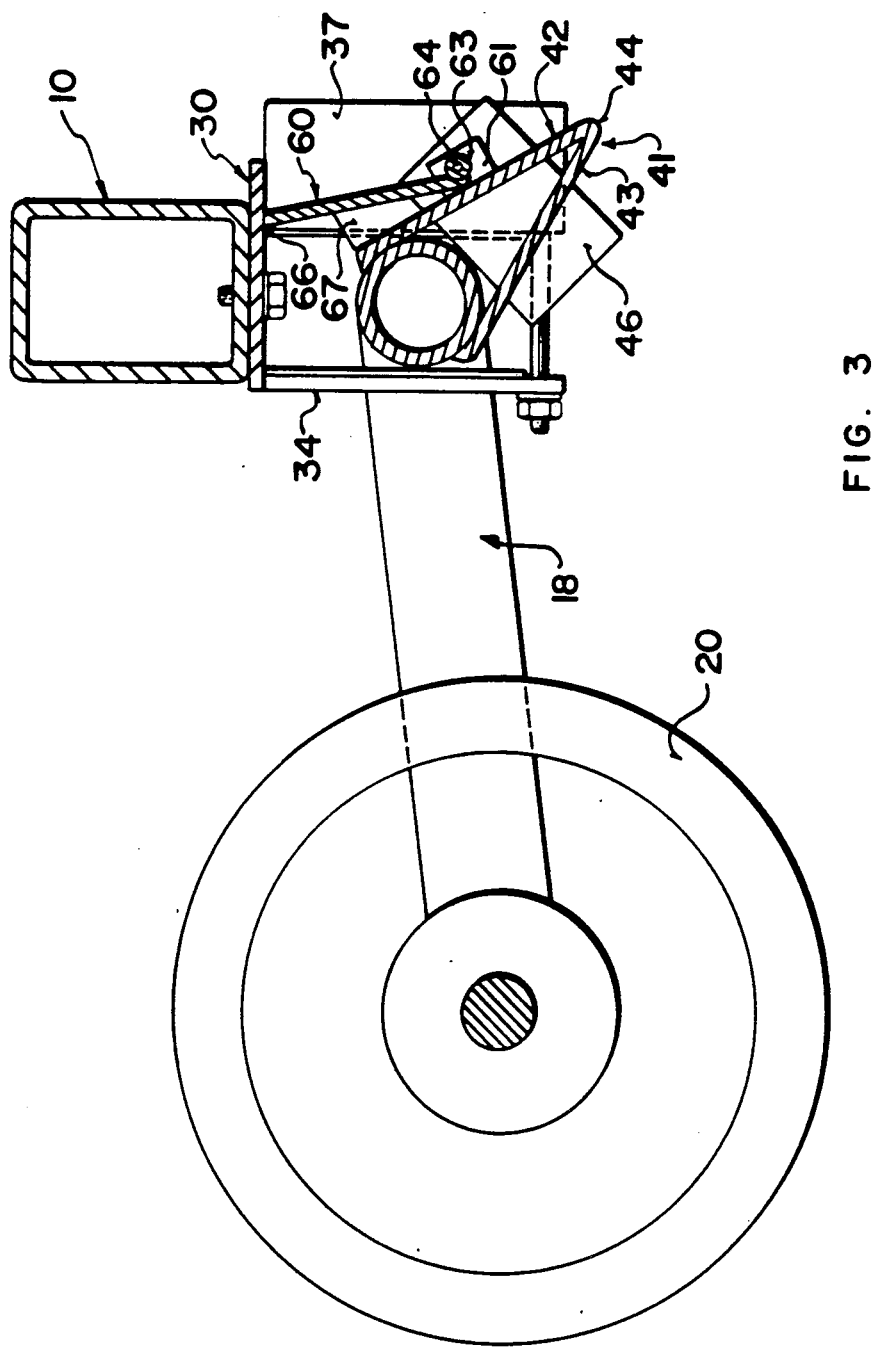
FIG. 3 is a cross sectional view similar to that of FIG. 2 showing the tool in a raised inoperative position.

Turning now to FIGS. 1 and 3, for moving the tool into the stored or retracted position shown in FIG. 3, there is provided a latch mechanism generally indicated at 60. The latch mechanism comprises a pair of plates 61 and 62 welded to the upper surface of the plate 42. A sleeve 63 is mounted upon a shaft 64 extending across between the upright plate 61 and 62 so that the sleeve can rotate about a horizontal axis parallel to the upper surface of the plate 42. Attached to the sleeve 63 is a flap 65 which is free to pivot about the axis of the shaft 64 from a free depending position shown in FIGS. 1 and 2 to a latch position shown in FIG. 3. An upper edge of the flap 65 is therefore attached by welding to the sleeve 63 and the flap includes an outermost edge 66 remote from the access of the sleeve 63. A wedge plate 67 is attached on the upper surface of the flap 65 as best shown in FIG. 1. In the position shown in FIGS. 1 and 2, the wedge plate 67 is merely free so that the flap is free to depend and does not in any way cooperate any action of the tool on the ground.

When however it is required to move into the retracted, inoperative position, the ground wheel is raised so that the tool bar 10 is moved downwardly toward the ground thus raising the tool relative to the ground and pivoting the link 18 in a clockwise direction as shown in FIG. 3. In this raised position, the flap 65 is flipped over manually into the raised position in which the wedge plate 67 lies against an upper part of the plate 42 thus holding the flap 65 against further movement in a counterclockwise direction from a position shown in FIG. 3. In this position the upper edge 66 of the flap engages under the plate 30 in a wedging action. As the ground wheel is then lowered and the tool bar raised, the weight of the tool element is applied to the link 18 in a counterclockwise direction thus forcing the plate 42 upwardly until the edge 66 of the flap 65 is wedged into position underneath the plate 30. In its position thus shown in FIG. 3, therefore, the tool is held in the raised position and is prevented from counterclockwise movement toward the ground by the wedging action provided by the flap 65, the plate 30 and the wedge plate 67.

The attachment system including the bracket and link for attachment of the tool to the tool bar is extremely simple and expensive and yet provides an effective control over the tool as it is drawn across the ground. In addition the channel and plate defining the bracket can be simply attached to the underside of an existing tool bar by bolting to the undersurface. A dedicated tool bar can have the plate welded to the underside for permanent attachment. In any event the use of a single bracket to support the tool with the bracket being relatively narrow in comparison with the tool avoids the difficulty of finding the required space on the existing tool bar. At the same time the length of the arms is relatively short so that there is a close coupling arrangement of the tool relative to the tool bar which it keeps it relatively under control with little side to side movement thus allowing little or no overlap between adjacent tools to cover the full extent of the ground.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A ground working implement comprising a tool bar for transportation in a horizontal orientation across ground to be worked, a ground working tool for engagement with the ground and an attachment bracket for mounting the tool on the tool bar for applying a pulling force to the tool to draw the tool across the ground in a working operation thereon, the tool including an attachment link member extending from the tool forwardly into engagement with the bracket and including an elongate transverse portion generally transverse to the pulling force for engaging the bracket, the bracket defining a channel member for receiving the transverse portion therein having a front restraining wall means and a rear restraining wall means spaced sufficiently to receive the transverse portion therebetween, means for mounting the channel member on the tool bar with said front and rear wall means generally upright, spaced first and second limit means for defining upper and lower limits allowing limited up and down movement of the transverse portion within the channel member, the transverse portion being shaped to allow rotation of the transverse portion about a longitudinal axis of the transverse portion within said channel member and cooperating engagement means including a first engagement means on the transverse portion and a second engagement means on the channel member for preventing movement of the transverse portion relative to the length of the channel member.

2. A ground working implement according to claim 1 wherein the bracket includes a base plate and means for attachment of the base plate to the tool bar such that the front and rear wall means project downwardly therefrom.

3. A ground working implement according to claim 2 wherein the tool bar comprises a tubular member of rectangular cross section having a lower horizontal wall and wherein the base plate is attached to a underside of the lower horizontal wall with said front and rear wall means projecting downwardly therefrom.

4. A ground working implement according to claim 2 wherein the base plate defines said upper limit means and wherein the second limit means is removable to allow insertion of the transverse portion into the channel member and removal therefrom.

5. A ground working implement according to claim 1 wherein the link member includes a pair of arms each attached to a respective end of the transverse portion externally of the channel member such that each arm extends rearwardly from the transverse portion beyond a respective end of the channel member.

6. A ground working implement according to claim 5 wherein each arm includes a bearing support member at an outer end thereof remote from said transverse portion and bearing means for defining an axis of rotation substantially parallel to said transverse portion so as to support between said arms a tool element which is rotatable about the axis defined by said arms.

7. A ground working implement according to claim 6 wherein a spacing between the arms at the outer ends of the arms is greater than a spacing between the axis of rotation and the transverse portion.

8. A ground working implement according to claim 1 wherein the channel member includes two parts thereof defining a space therebetween and wherein the transverse portion includes said first engagement means thereon which extends from the transverse portion into the space.

9. A ground working implement according to claim 8 wherein the first engagement means includes sides each having a bearing face thereon lying in a plane substantially at right angles to the axis of the transverse portion and wherein the channel member includes a pair of bearing surfaces each facing toward the space so as to engage the sides of said first engagement means on the transverse portion.

10. A ground working implement according to claim 9 wherein the first engagement means on the transverse portion extends forwardly of the transverse portion.

11. A ground working implement according to claim 8 wherein the channel member is partly defined by a pair of angle irons each having a first flange defining one of said front and rear wall means and a second flange at right angles thereto for engagement with said first engagement means on the transverse portion.

12. A ground working implement according to claim 8 wherein the first engagement means comprises a first plate and a second plate attached to upper and lower surfaces respectively of the transverse portion and extending therefrom to an apex and a second pair of plates at right angles to the first pair of plates and attached to side edges thereof so as to bridge a space between the first and second plates.

13. A ground working implement according to claim 1 including latch means for latching the attachment link member in a raised position holding the tool out of engagement with the ground.

14. A ground working implement according to claim 13 wherein the first engagement means extends outwardly from the transverse portion in a direction opposite to said tool, said latch means comprising a wedge member extending from the first engagement means to the channel member to hold the attachment link member against rotation in the direction away from the raised position, said wedge member being removable to a release position.

* * * * *